(12) United States Patent
Singer et al.

(10) Patent No.: US 7,917,426 B1
(45) Date of Patent: *Mar. 29, 2011

(54) SYSTEM AND METHOD FOR PROCESSING AND DISPLAYING QUANTITY INFORMATION DURING USER-CONFIGURABLE TIME PERIODS

(75) Inventors: Scott F. Singer, Lake Bluff, IL (US); Michael J. Burns, Chicago, IL (US); Robert A. West, Chicago, IL (US); Stephen A. Schwarz, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 56 days.

This patent is subject to a terminal disclaimer.

(21) Appl. No.: 12/325,427

(22) Filed: Dec. 1, 2008

Related U.S. Application Data

(63) Continuation of application No. 10/376,437, filed on Feb. 28, 2003, now Pat. No. 7,558,754.

(51) Int. Cl.
   *G06Q 40/00* (2006.01)
(52) U.S. Cl. ......................................................... 705/37
(58) Field of Classification Search ...................... 705/37
   See application file for complete search history.

(56) References Cited

U.S. PATENT DOCUMENTS

| | | | |
|---|---|---|---|
| 4,674,044 A | 6/1987 | Kalmus | |
| 4,750,135 A | 6/1988 | Boilen | |
| 4,903,201 A | 2/1990 | Wagner | |
| 5,038,284 A | 8/1991 | Kramer | |
| 5,077,665 A | 12/1991 | Silverman | |
| 5,101,353 A | 3/1992 | Lupien | |
| 5,136,501 A | 8/1992 | Silverman | |
| 5,270,922 A | 12/1993 | Higgins | |
| 5,297,031 A | 3/1994 | Gutterman | |
| 5,297,032 A | 3/1994 | Trojan | |
| 5,347,452 A * | 9/1994 | Bay, Jr. ........................... 705/37 |

(Continued)

FOREIGN PATENT DOCUMENTS

EP           1067471 A1          1/2001

(Continued)

OTHER PUBLICATIONS

Unpublished U.S. Appl. No. 10/260,643, entitled "System and Method for Displaying Highest and Lowest Traded Prices of Tradable Objects," filed Sep. 30, 2002.

(Continued)

*Primary Examiner* — James A Kramer
*Assistant Examiner* — Jessica L Lemieux
(74) *Attorney, Agent, or Firm* — McDonnell Boehnen Hulbert & Berghoff LLP

(57) ABSTRACT

A system and method for displaying quantity related information determined for a plurality of time periods are described. According to one method, a trader may define one or more time periods for which a trading application may determine traded quantities, traded buys, traded sells, or other quantity related information at a plurality of price levels during the defined time periods. The trading application may then graphically display the quantities for each time period in relation to the static axis of prices. The method further includes periodically updating the displayed traded quantity to reflect the quantity during the defined time period, where the quantity is updated based on subsequent market updates that are received from the exchange for the tradable object.

27 Claims, 9 Drawing Sheets

U.S. PATENT DOCUMENTS

| | | | |
|---|---|---|---|
| 5,689,651 | A | 11/1997 | Lozman |
| 5,774,877 | A | 6/1998 | Patterson |
| 5,793,301 | A | 8/1998 | Patterson |
| 5,797,002 | A | 8/1998 | Patterson |
| 5,845,266 | A | 12/1998 | Lupien |
| 5,915,245 | A | 6/1999 | Patterson |
| 5,924,082 | A | 7/1999 | Silverman |
| 5,924,083 | A | 7/1999 | Silverman |
| 5,946,667 | A | 8/1999 | Tull |
| 5,963,923 | A | 10/1999 | Garber |
| 6,012,046 | A | 1/2000 | Lupien |
| 6,014,643 | A | 1/2000 | Minton |
| 6,035,287 | A | 3/2000 | Stallaert |
| 6,098,051 | A * | 8/2000 | Lupien et al. ............... 705/36 R |
| 6,131,087 | A | 10/2000 | Luke |
| 6,134,535 | A | 10/2000 | Belzberg |
| 6,195,647 | B1 | 2/2001 | Martyn |
| 6,272,474 | B1 * | 8/2001 | Garcia ........................ 705/36 R |
| 6,278,982 | B1 | 8/2001 | Korhammer |
| 6,282,521 | B1 | 8/2001 | Howorka |
| 6,408,282 | B1 | 6/2002 | Buist |
| 6,766,304 | B2 | 7/2004 | Kemp |
| 6,772,132 | B1 | 8/2004 | Kemp, II et al. |
| 6,907,404 | B1 | 6/2005 | Li |
| 6,938,011 | B1 | 8/2005 | Kemp, II et al. |
| 7,024,387 | B1 | 4/2006 | Nieboer et al. |
| 7,127,424 | B2 | 10/2006 | Kemp, II et al. |
| 7,389,268 | B1 | 6/2008 | Kemp, II et al. |
| 7,426,491 | B1 | 9/2008 | Singer et al. |
| 7,558,754 | B1 | 7/2009 | Singer et al. |
| 2002/0010672 | A1 | 1/2002 | Waelbroeck et al. |
| 2002/0023038 | A1 | 2/2002 | Fritsch |
| 2002/0035534 | A1 | 3/2002 | Buist |
| 2002/0055899 | A1 | 5/2002 | Williams |
| 2002/0059129 | A1 | 5/2002 | Kemp |
| 2002/0073017 | A1 * | 6/2002 | Robertson ....................... 705/37 |
| 2002/0099644 | A1 | 7/2002 | Kemp |
| 2002/0120551 | A1 | 8/2002 | Jones |
| 2002/0138401 | A1 | 9/2002 | Allen |
| 2003/0004853 | A1 | 1/2003 | Ram |
| 2003/0009411 | A1 | 1/2003 | Ram |
| 2003/0023542 | A1 | 1/2003 | Kemp |

FOREIGN PATENT DOCUMENTS

| | | | |
|---|---|---|---|
| WO | 9114231 | A1 | 9/1991 |
| WO | 95/26005 | A1 | 9/1995 |
| WO | 9849639 | A1 | 11/1998 |
| WO | 9919821 | A1 | 4/1999 |
| WO | 99/30259 | A1 | 6/1999 |
| WO | 9953424 | A1 | 10/1999 |
| WO | 00/52619 | A1 | 9/2000 |
| WO | 00/62187 | A2 | 10/2000 |
| WO | 00/62187 | A3 | 10/2000 |
| WO | 00/65510 | A1 | 11/2000 |
| WO | 01/16830 | A1 | 3/2001 |
| WO | 01/16852 | A2 | 3/2001 |
| WO | 01/22315 | A2 | 3/2001 |
| WO | 0165403 | A2 | 9/2001 |
| WO | 01/88808 | A1 | 11/2001 |
| WO | 02/15461 | A2 | 2/2002 |
| WO | 0229686 | A1 | 4/2002 |
| WO | 01/16852 | C1 | 6/2002 |
| WO | 02/48945 | A1 | 6/2002 |
| WO | 02/059815 | A1 | 8/2002 |
| WO | 02/079940 | A2 | 10/2002 |
| WO | 02/093325 | A2 | 11/2002 |
| WO | 03090032 | A2 | 10/2003 |
| WO | 03090032 | A3 | 10/2003 |

OTHER PUBLICATIONS

Weber, Information Technology in the Major International Financial Markets, Apr. 7, 1993.
Trading Screen, TIFFE Exchange, circa 1989-1990*.
Trading Screen, MEFF Exchange, circa 1990*.
Cavaletti, Order Routing Article, Futures Magazine, Feb. 1997.
Aurora Article, CBOT, circa 1989*.
One Click Trading Options, Trading Technologies, circa 1998.
Trading Screen, SWX Exchange, circa 1990*.
Expanding futures and options trading around the world, around the clock, GLOBEX, circa 1989*.
Hansell, The computer that ate Chicago, Institutional Investor, Feb. 1989.
Globex Report: An update on the CME Global electronic exchange, Feb. 10, 1989.
Nymex Access Documents, New York Mercantile Exchange, Feb. 28, 1992.
CATS Traders' Manual, Toronto Stock Exchange, Sep. 30, 1977.
Market Watch, Trading Screen, date not available.
Grummer, Peake, Sellers, Preliminary Feasibility Study, Bermudex Ltd., Nov. 1980.
Peake, Mendellson, The ABCs of trading on a national market system, Appendix C of Preliminary Feasibility Study, Bermudex Ltd., Sep. 1997.
Peake, The last 15 meters, Appendix E of Preliminary Feasibility Study, Bermudex Ltd., Jun. 15, 1997.
Declaration of Brendan Bradley in Case No. 04 C 5312, Nov. 18, 2004.
Memorandum Opinion Published Feb. 9, 2005, of Judge James B. Moran in Case No. 04 C 5312.
Wamex Holdings Inc. Outlines Online Trading Procedure for it's One-on-one Internet Trading System, Jun. 14, 2001.
USPTO Presentation, NASDAQ, Nov. 8, 2001.
Kharouf, A Trading Room with a View, Futures, 27, 11-Nov. 1998.
www.tradingtechnologies.com/products/xtrade_full.html (viewed May 22, 2001) Jun. 9, 2000.
APT Brochure, LIFFE Exchange, circa 1990*.
Trading Screen, INTEX of Bermuda, circa 1984*.

* cited by examiner

SYSTEM AND METHOD FOR PROCESSING AND DISPLAYING QUANTITY INFORMATION DURING USER-CONFIGURABLE TIME PERIODS

RELATED APPLICATIONS

The present application is a continuation of U.S. application Ser. No. 10/376,437 filed on Feb. 28, 2003, which is herein incorporated by reference in its entirety.

FIELD OF INVENTION

The present invention is directed towards electronic trading. More specifically, the present invention is directed towards processing and displaying information related to the traded volume associated with a tradable object.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker. Sometimes, electronic trading systems are also convenient for brokers or other market participants on the floor at an exchange for receiving market information.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the limits of the order, for example price and quantity, and prioritizes the order with other orders of the same price. When buy and sell order prices cross in the market, a trade occurs and information of which is then relayed in some fashion to the client devices. In fact, the host exchange publishes a data feed to the client devices so that the traders can have access to the most current market information.

Market information commonly includes information related to the inside market and market depth. The inside market is the lowest sell price in the market and the highest buy price in the market at a particular point in time. Market depth refers to quantity available at the inside market and can refer to quantity available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for an infinite number of price levels, while some provide only quantities associated with the inside market, and others may provide no market depth at all. Additionally, host exchanges can offer other types of market information such as the last traded price (LTP), the last traded quantity (LTQ), and/or order fill information.

To profit in electronic markets, however, market participants must be able to assimilate large amounts of data, including market information, and react to the received data more quickly than other competing market participants. It is therefore desirable to offer tools that can assist a market participant to make desirable trades at the most favorable prices in a speedy and accurate manner.

Thus, it is desirable for electronic trading applications to offer tools that can assist a trader in trading in an electronic trading environment, help the trader make trades at the most favorable prices in a speedy and accurate manner, and offer tools that can assist a trader to view market trends and current market conditions. In the following detailed description, a method and interface for displaying information related to the traded quantities are described. These tools, as described below, provide advantages to a trader in an electronic trading environment.

BRIEF DESCRIPTION OF THE DRAWINGS

Embodiments of the present invention are described herein with reference to the following drawings, in which.

DETAILED DESCRIPTION OF THE PREFERRED EMBODIMENT(S)

It is beneficial to offer tools that can assist a trader in trading in an electronic trading environment and help the trader to view market trends and current market conditions in a speedy and accurate manner. According to one embodiment described hereinafter, a trader may define one or more time periods, and a trading application, based on data feeds provided from an exchange, may determine a total traded quantity associated with a tradable object at a plurality of price levels that have been traded during the defined time period(s). The trading application may then graphically display the traded quantities, associated with at least one time period, for each of the plurality of price levels in association with a static axis of prices. It should be understood that the display could show consolidated prices so that for instance, a cell could correspond to a range of prices instead of one price. More information on price consolidation may be found in U.S. patent application Ser. No. 09/971,087, now U.S. Pat. No. 7,127,424, filed on Oct. 5, 2001, "Click Based Trading with Intuitive Grid Display of Market Depth and Price Consolidation," the contents of which are fully incorporated herein. The trading application may then continually update the displayed traded quantities for the user-defined time period(s) based on subsequent updates being received from the exchange.

While the present invention is described hereinafter with reference to illustrative embodiments for particular applications, it should be understood that the present invention is not limited thereto. Those having ordinary skill of art will recognize that many additional modifications and embodiments are possible as well.

Figure 1:
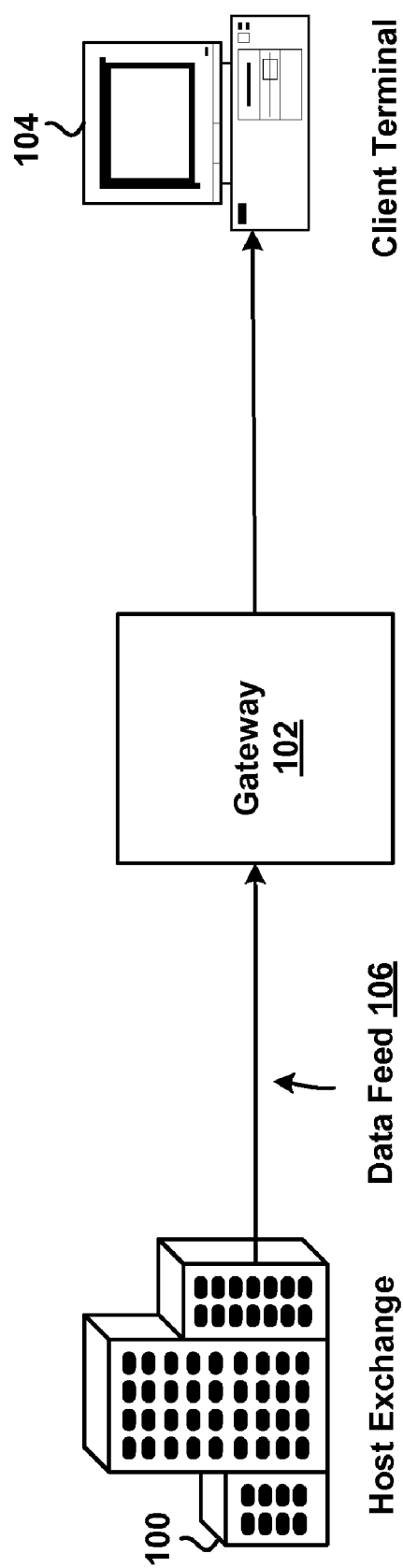
FIG. 1 is an example of a network configuration for a communication system utilized to access one or more exchanges.

FIG. 1 shows an example system that may be used to implement network connection between an exchange and client terminals. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, as in most communications applications, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware and/or software logic. For instance, a processor executing a set of machine language instructions stored in memory may execute various functions. Provided with the present disclosure, those skilled in the art can readily prepare appropriate computer instructions to perform such functions.

Referring back to FIG. 1, the illustrated system includes a host exchange 100, a gateway 102, and a client terminal 104. It should be understood that even though the system illustrates only one client terminal 102 communicating with a single host exchange 100, the client terminal 102 could also communicate with more than one host exchange via the gateway 102 or other gateways corresponding to each host exchange. Further, it should be understood that the example system is not limited to a single client terminal. In an alternative embodiment, a trading house including a plurality of client terminals may connect to the host exchange 100 via the gateway 102.

The host exchange 100 may include the Chicago Board of Trade ("CBOT"), the New York Stock Exchange ("NYSE"), the Chicago Mercantile Exchange ("CME"), Xetra (a German stock exchange), or the European derivatives market ("Eurex"). However, it should be understood that the exchanges could also include any other existing or later developed exchanges. Further, it should be understood that the preferred embodiments are not limited to any particular network architecture or trading application, but rather may be applied with utility on any client device in any network that can be used for electronic trading.

The host exchange 100 connects to the client terminal 104 via the gateway 102. The gateway 102, as is known in the art, may include one or more computers, or software programs, and receives information from the host exchange 100 and sends the information down to the client terminal 104. Preferably, the gateway 102 receives data from the host exchange 100 and converts the received data to a format compatible with the protocols used on the client terminal 104. Alternatively, the conversion could be performed at the client terminal 104.

The host exchange 100 provides market information to the client terminal 102, and may relay this information, or a portion thereof, collectively called a data feed 106, over a network to market participants at the client terminal 104. A data feed from one exchange may contain different information representing different tradable objects than another data feed from a second exchange. In one embodiment, a data feed may include market information related to all tradable objects being traded at the host exchange 100. In such an embodiment, when the client terminal 104 receives such a data feed, a trading application on the client terminal 104 may extract from the received data feed information related to one or more tradable objects selected by a user at the client terminal 104. Alternatively, the gateway 102 could be configured to extract the information related to tradable objects selected by a particular user at the client terminal 104, and could send only the relevant information to the client terminal 102. Further, alternatively, the host exchange 100 may have knowledge of tradable object(s) that were selected by a user at the client terminal 104, and may provide to the client terminal 104 only market data related to the selected tradable objects.

As used herein, the term "tradable object" refers simply to anything that can be traded with a quantity and/or price. It includes, but is not limited to, all types of tradable objects such as financial products, which can include, for example, stock options, bonds, futures, currency, and warrants, as well as funds, derivatives, and collections of the foregoing, and all types of commodities, such as grains, energy, and metals. The tradable object may be "real," such as products that are listed by an exchange for trading, or "synthetic," such as a combination of real products that is created by a user. Also, a tradable object could actually be a combination of other tradable objects, such as a class of tradable objects.

The data feed 106 may include information relating to prices and quantities of one or more tradable objects. For example, the data feed 106 could provide data corresponding to quantities at inside market prices, data corresponding to quantity at different prices, total traded quantities for the entire trading day that are updated throughout the day, last traded price, last traded quantity, and other information. The trading application may derive additional information, such as quantities or prices based on the data received from the exchange, and other data inputs. The inside market is the highest bid price ("HBP") and the lowest ask price ("LAP") for a tradable object. Data feeds from some exchanges may also provide data related to the market depth. The extent of the market depth available to a trader depends on the host exchange, and some exchanges provide an infinite market depth, while others provide only quantities associated with the inside market and some may provide no market depth.

The client terminal 104 may include any computing terminal, such as a personal computer, a handheld device, or any other currently existing or later developed computing terminals. Further, it should be understood that the client terminal 104 may connect to the gateway 102 via wireless communication links, wireline communication links, or a combination thereof. In general, according to the embodiments described herein, the client terminal 104 is a computer that allows a trader to participate in the market hosted at the exchange 100, and uses software that creates specialized trading screens on the client terminal. The range and quality of features available to the trader on his or her client terminal's screen may vary according to the specific software application being run on the client terminal 106. Among other functional features, a trading screen being run on the client terminal 106 may enable traders to enter and execute orders, obtain market quotes, and monitor positions. However, it should be understood that, in addition to interactive trading screens, the client terminal 104 may also run automated non-interactive types of trading applications.

A commercially available trading application that allows a user to trade in a system like the one shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage and display functions.

The example embodiments for displaying information related to the last traded quantity related to a tradable object will be described below in reference to the MD Trader™-style display that displays information, such as orders to buy or orders to sell, in association with price levels arranged along a common static axis or scale of prices. The quantities associated with the orders to buy are preferably displayed in a bid display region, and quantities associated with orders to sell are preferably displayed in an ask display region.

The quantities for each order being displayed via the MD Trader™-style display may be displayed using any indicator types. For example, the indicator can be a graphical representation of quantity (e.g., colors, bars, etc.) or can simply be a number. The price levels are fixed in relation to bid and ask display regions such that the indicators displayed in these regions can move relative to the display (e.g., the screen). For example, the portion of the static axis that is being viewed can be changed by scrolling up or down the axis or by entering a repositioning command. One embodiment using this type of display system displays market information with respect to a vertical axis so that the market information fluctuates logically up and down relative to the axis as the market prices fluctuate. It should be understood that while the example embodiments for displaying traded quantity at price levels of a tradable object are described in reference to the MD Trader™-style display, the present invention is not limited to any particular display and could be used with different or equivalent displays. Further, it should be understood that many modifications to the MD Trader™-style display are possible as well. For example, information related to a tradable object may be displayed horizontally relative to a horizontally oriented axis, n-dimensionally, or in any other fashion.

Figure 2:
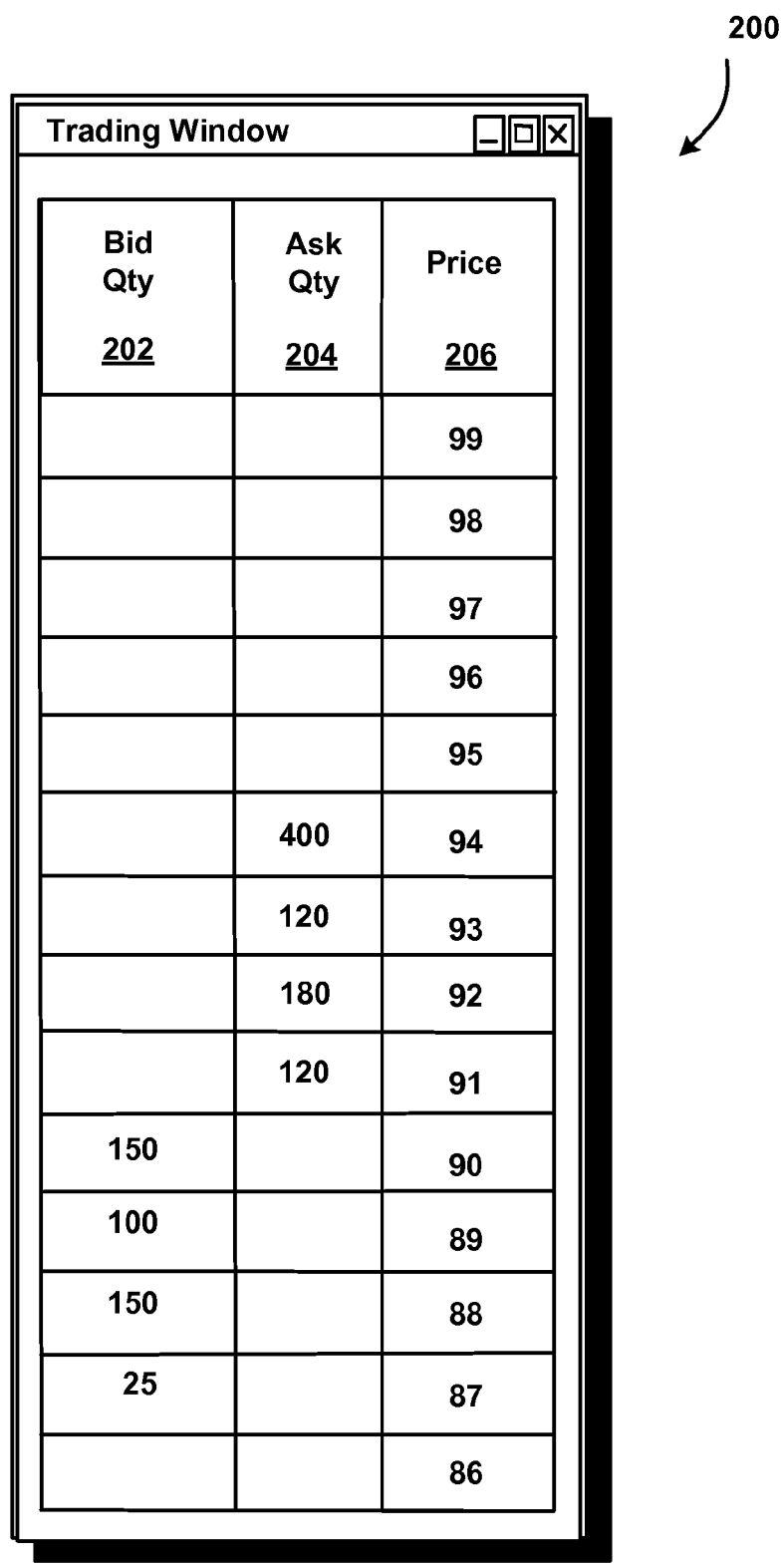
FIG. 2 is a block diagram illustrating a trading interface that may be used for submitting orders to a market according to one example embodiment.

In a fast moving market, where varying price levels are trading (i.e., bids and offers entering the market are being matched at different prices), it is beneficial for a trader to be able to quickly enter orders and analyze market information. FIG. 2 illustrates a display 200 that allows a trader to quickly enter orders at specific price levels by clicking next to a static axis of prices, displayed as a static column, and to quickly and easily see information such as working orders. The display 200 may be used to display traded quantity by price as will be described in greater detail below.

The display may generally include a number of different regions that may be used to display other market information in addition to the last traded quantities over one or more user-configurable time periods. As shown in FIG. 2, the display 200 includes a price column 206, a bid quantity ("Bid Qty") column 202, and an ask quantity ("Ask Qty") column 204. In the preferred embodiment, the three columns are shown in different colors so that a trader can distinguish them. Further, it should be understood that a trader has the ability to control the arrangement of the columns on the display. For example, the Bid Qty column 202 and the Ask Qty column 204 could be positioned to the left of the price column 200. However, it should be understood that other arrangements are possible as well. The Bid Qty column 202 displays bid quantities, and the Ask Qty column 204 displays ask quantities. The representative prices for a given tradable object are shown in the price column 206.

As mentioned in the preceding paragraphs, the price column 206 includes a static axis of prices. It should be understood that static, in the context of the embodiments described hereinafter, does not mean immovable, but rather fixed in relation. For example, with a static axis of prices, the axis itself may be movable (e.g., via a recentering or repositioning command), but the prices represented remain fixed in relation to the market information, subject to consolidation or expansion. Further, for example, the static axis of prices stays fixed even when the market moves or when the market changes unless a repositioning command is received. It should be understood that in one embodiment, the static axis of prices could be displayed in any manner, including in a row, on any angle, or n-dimensionally, without departing from the invention. Further, alternatively, prices do not need to be displayed.

It should be understood that the display 200 is not limited to the columns and information described in reference to FIG. 2, and various other information may be presented in relation to the display 200. More information relating to the X_TRADER® and the MD Trader™-style display are described in U.S. patent application Ser. No. 09/590,692, now U.S. Pat. No. 6,772,132, entitled "Click Based Trading With Intuitive Grid Display of Market Depth," filed on Jun. 9, 2000, U.S. patent application Ser. No. 09/971,087, now U.S. Pat. No. 7,127,424, entitled "Click Based Trading With Intuitive Grid Display of Market Depth and Price Consolidation," filed on Oct. 5, 2001, and U.S. patent application Ser. No. 10/260,643, entitled "System and Method For Displaying Highest And Lowest Traded Prices Of Tradable Object," filed on Sep. 30, 2002, the contents of which are incorporated herein by reference. Moreover, the trading application may implement tools for trading tradable objects that are described in U.S. patent application Ser. No. 10/125,894, now U.S. Pat. No. 7,389,268, filed on Apr. 19, 2002, entitled "Trading Tools for Electronic Trading," the contents of which are incorporated herein by reference. The specific features of the embodiments of a display as in FIG. 2 are an example of one embodiment of a screen that can be used with the present invention. It should be understood that the present invention is not limited, however, to such a screen display, and could be used with any type of screen display.

Volume by Price During User-Configurable Time Periods

As mentioned earlier, one of the features that are often displayed to a trader via a trading interface is the LTQ, which is typically associated with an LTP. The LTQ generally reflects the quantity of the last match performed by the exchange's matching engine, while the LTP generally reflects the price level of the match. When a trader enters an order, the trader may specify a price and a quantity for the order that can be a buy or a sell. When filling the order, the matching engine matches the order against all or part of one or more other orders. For example, a buy order at a specified price level may be matched with a corresponding sell. It should be understood that an order may be matched against several orders, either at one or multiple price levels, and an order may be matched against portions of one or more orders.

In addition to displaying the LTQ, the trading screen may also display the total traded quantity ("TTQ") that has been traded for that tradable object at all price levels during a trading day. Additionally, TTQ can also be displayed per each price level, often referred to as a TTQ at price. However, such a display, while allowing a trader to view the total volume for the entire trading day, does not enable the trader to monitor market trends and conditions related to the volume that have been traded during the most recent time period or any other time period that the trader may consider useful. Using the existing total traded quantity display, a trader will not be able to determine if the traded volume at a certain price level corresponds to the volume that has been traded a few minutes or a few hours ago, thus possibly causing the trader to misjudge trading conditions or market trends. According to example embodiments, instead of or in addition to displaying the total traded quantity for the entire trading day, the trading screen may also display quantity related information during one or more user configurable time periods, such as a time period corresponding to the last 10 minutes or last hour, for example.

In one embodiment, a trading application on a client terminal, a gateway, or any other network entity, may receive market updates from an exchange and use the information provided in the updates to determine traded quantity related information. Exchanges generally provide market updates using a variety of different methods that may affect a method of calculating traded quantities, and display thereof. According to one method, the exchange may provide periodic updates of market information to the connected client terminals. In such an embodiment, the exchange can provide updates at predetermined time intervals, and each update can reflect the changes in the market that occurred during the predetermined time interval. Exchanges such as Eurex provide updates using this method. According to a second method, the exchange may provide an update each time the market changes. Exchanges such as the London International Financial Futures and Options Exchange ("LIFFE"), the Chicago Mercantile Exchange ("CME"), and Island ECN provide updates using this method. For example, if three subsequent fills of 5, 5, and 12 are detected for the same price level, a LIFFE exchange may provide three subsequent updates including the traded quantities of 5, 5, and 12 and the price level at which the trades were executed. However, a Eurex exchange, instead of providing an update each time the market changes, may provide three updates at the predetermined time intervals, and the updates may specify the traded quantities of 5, 10, and 22 reflecting the change in the market at that price level.

An exchange can provide market updates related to one or more tradable objects, for example, by sending data structures to its client devices. The data structures can be sent through intermediate devices, such as gateways, and the intermediate devices may reformat the data structures before ultimately providing them to the client devices. Generally, each client device receives a single data structure that includes different market information, such as the LTQ, TTQ, last traded price, bid/ask amounts at each price level, market depth, and other information. Alternatively, this information can be provided to a client device using more than one data structure. Each exchange may use a different type of data structure and may provide different information. For an exchange that provides continual updates, a data structure may be transmitted each time the market changes, such as when a trade is executed. For an exchange that provides updates at predetermined time intervals, the data structure can be provided to the client devices at the predetermined intervals with no data structures sent that reflect intervening market changes.

While the predetermined intervals can be set and varied by exchanges, an exchange may provide the market updates, for example, every 1-2 seconds. It should be understood that this interval is only an example, and an exchange may use a longer or shorter time interval. By providing information at intervals, the exchange can reduce the bandwidth used to transmit data structures to its client devices. Therefore, for a heavier market usage, the exchange may provide the market updates more infrequently in order to conserve bandwidth. For fewer users or lighter market volume, the exchange may decide to provide the market updates more frequently, and the intervals may vary based on the particular exchange, and may be dynamically altered by the exchange during a connection with the exchange.

According to an example embodiment, for an exchange that provides updates each time the market changes, the trading application would receive an update for each market change. Thus, for each match, the trading application would receive an update that includes an LTQ value for that match. The total traded quantity over a predetermined time period may be then computed by summing the received LTQ values. Alternatively, if such an exchange provides TTQ at each price level, the trading application could instead compute a difference between the last two TTQ for each price level and input the quantity to a bucket corresponding to the most recent time period. It should be understood that the trading application may first buffer the LTQ values, and then sum the values corresponding to one or more user configurable time periods.

The traded quantity data that is received from an exchange may be processed using many different methods. For example, when the exchange provides updates each time the market changes, the trading application may buffer the received LTQ in a number of buckets, where each bucket is associated with a predetermined time period. For example, when the trading application displays traded quantities for the last five minutes of trading, the trading application may store the received data in the buckets of 1 minute each. In such an embodiment, the first bucket may correspond to the current time ("t"), the second bucket may correspond to the previous 1 minute ("t−1"), the third bucket may correspond to one minute before (t−2), etc. The trading application may then determine a traded quantity for the last five minutes by summing data stored in the buckets corresponding to times t−1, t−2, t−3, t−4, and t−5, respectively. When one minute is up, the data being stored in the buckets t−5, t−4, t−3, t−2, t−1, and t may be dynamically shifted one bucket down. For example, using such a method, the data stored in the bucket t−5 may be shifted to a bucket t−6, etc., until the data stored in the bucket "t" is shifted to the bucket t−1, thus effectively emptying the first bucket corresponding to the most current time period. In such an embodiment, the trading application may update the traded quantity being displayed via the trading interface every minute, or effectively every time the data is shifted between the buckets for every buckets corresponding to the time periods corresponding to the time before the current or "t" time period. Therefore, the displayed quantities corresponding to the current time period may effectively keep changing based on the updates being received from an exchange, while the traded quantities corresponding to the earlier time periods may be shifted between the buckets corresponding to each time period.

It should be understood that any number of buckets can be used, and each bucket may correspond to a larger or smaller time interval. Further, for example, instead of having a large number of buckets, a predetermined number of buckets can be used where buckets 1 through N−1 may be used for storing data corresponding to a preset time interval, such as the last 60 minutes, while the last bucket, the Nth bucket, may provide means for storing data corresponding to the rest of the day. In such an embodiment, every time data is shifted from the N−1 bucket, the data may be stored in the Nth bucket. Further, alternatively, instead of shifting data between the buckets, a new bucket may be created to store traded quantity values corresponding to the most recent time interval, and data in the last bucket may be discarded or stored in the bucket corresponding to the rest of the day.

The total volume by price can be calculated using many methods, and the method applied may depend on what information is provided in the update that is received from an exchange. As mentioned in the preceding paragraphs, if an exchange sends updates every time a new trade is detected, the trading application may sum LTQ values specified in each update to determine the total traded quantity value for preset time periods corresponding to each price level. However, if an exchange provides periodic updates, the trading application might use not only the LTQ but also the TTQ since the start of the trading day specified in each update to determine the total traded volume that has been traded during one or more time periods, the embodiments of which are described hereinafter.

When an exchange provides periodic updates, one periodic update may include updated market information as a result of several different market events, but it would only include one LTQ for the most recent match performed by the exchange's matching engine. If such a method of sending updates is used by an exchange, the trading application may not receive an LTQ for each match that has occurred during a time interval between two updates, thus preventing the trading application from simply summing the received LTQs. In such an embodiment, the trading application may estimate the LTQ that has occurred during the time between the updates by comparing the TTQ in the last update with the TTQ in the previous update. It should be understood that these TTQs correspond to TTQs associated with the entire trading day and correspond to all prices. For example, if the first update includes an LTQ of 10 at the LTP of 100, and the TTQ of 110, and the next update includes an LTQ of 22 at the same LTP of 100, and the TTQ of 122, the trading application may use the received LTQs to determine that during the time interval between the two updates the quantity of 12 (i.e., 22-10) has been traded at the LTP of 100. Then, the trading application may verify the LTQ value at the LTP of 100 by comparing the two TTQs. Using the last two TTQs, the trading application may determine that the change in the TTQ is 12, thus confirming that there have been no missed fills between the received updates. In such an embodiment, therefore, the difference between two TTQs may be used to estimate that the difference in two LTQs applies to the same price.

However, using another example, the trading application may receive a first update including an LTQ of 22 at the LTP of 100, and the TTQ of 122. Subsequently, the trading application may receive a second update including an LTQ of 24 at the LTP of 100, and the TTQ of 153. Using the received updates, the trading application may use the two LTQs to determine that the quantity of 2 has been traded at the LTP of 100 during the time interval between the received updates. However, using the TTQs, the trading application may determine that the total traded quantity has changed by 31 (i.e., the current TTQ minus the previous TTQ), thus indicating that the quantity of 24 has been traded at the LTP of 100, and that the quantity of 7 has been traded at a price level other than 100, such as 101, 99, or some other price level. In such an embodiment, the trading application may add the quantity of 7 to the quantities at the price level of 100. However, it should be understood that different embodiments are possible as well. For example, the additional quantity of 7 may be added to the quantities at the price levels other than the LTP, such as a price level one or more ticks higher/lower from the LTP. Alternatively, the quantity of 7 may be distributed between one or more price levels and such a user-defined algorithm may control how the quantity is distributed between two or more price levels. Further, it should be understood that the present invention is not limited to the methods of determining traded quantities described above, and different methods could also be used.

Figure 3:
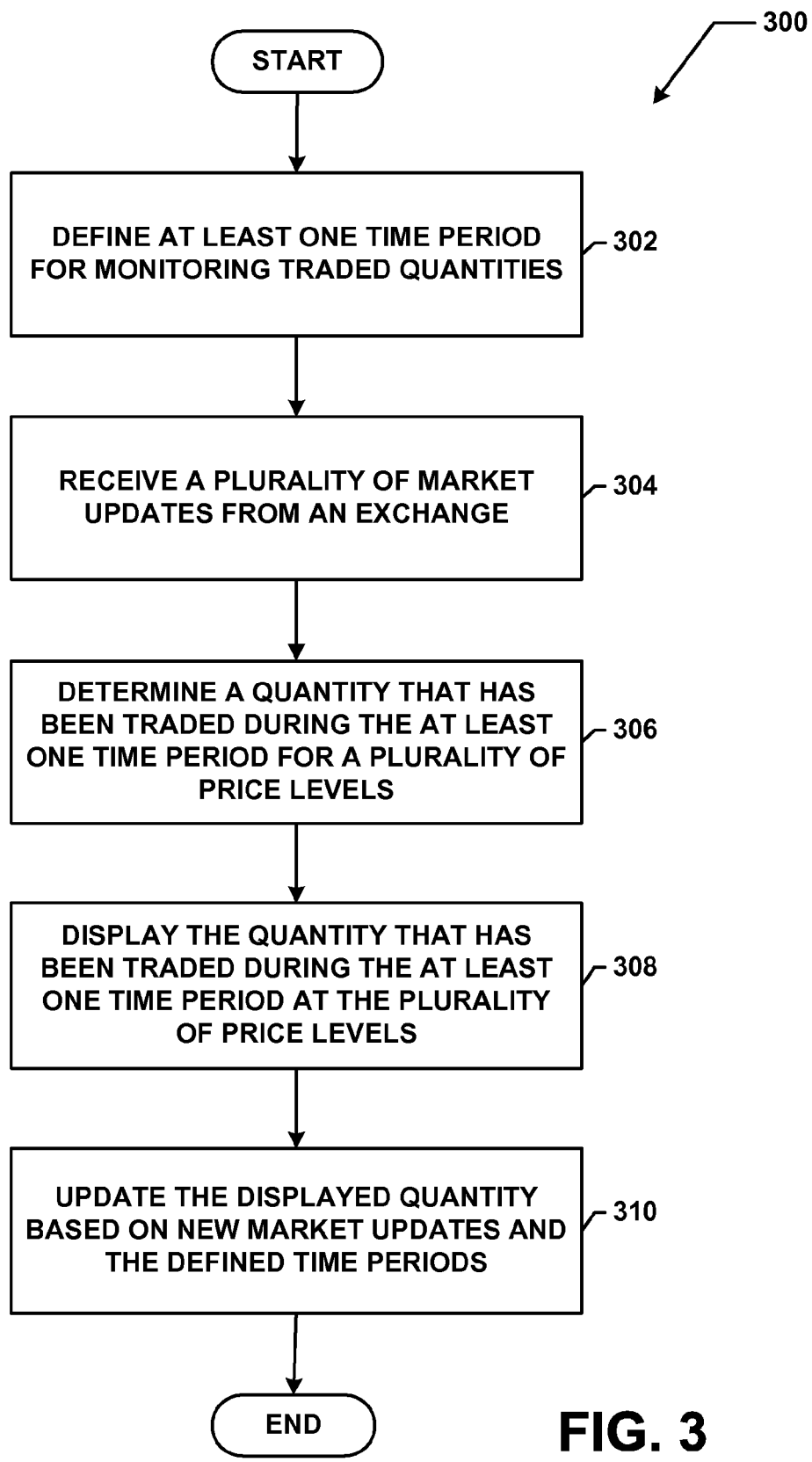
FIG. 3 is a flow chart illustrating a method for displaying traded quantity information for a plurality of time periods according to one example embodiment.

FIG. 3 is a flow chart illustrating a method 300 for determining and displaying traded quantity related information for at least one time period. The method 300 may be performed by a trading application located on a client device, a gateway, or any other network entity that directly or indirectly receives market updates from an exchange.

At step 302, a trading application receives at least one time period during which it should monitor traded quantities. It should be understood that the at least one time period may be user configurable or preset by the application. A trader may specify one or more time periods using any means, such as a graphical interface, for example. The graphical interface can specify one or more default time period values, and a trader may then alter the default values to any desirable value. Alternatively, it is also possible that the trading software may specify a number of static user-selectable time periods. In such an embodiment, the trader may select one or more desired time periods from the list of available time periods.

Further, a trader may reset each time period by selecting a predetermined user selection input or by entering a predetermined key combination. When the trading application detects such an input, the trading application may reset the start of one or more time periods and determine traded quantity values starting from the time of receiving the user selection input. Alternatively, resetting of the time period may be performed automatically upon detecting one or more external user configurable triggers. For example, a trigger may include a trader-related trigger such as detecting a flat/long/short position of a trader, a market-related trigger such as detection of a market movement, or a combination thereof.

At step 304, a trading application receives from an exchange a plurality of market updates related to a tradable object. At step 306, the trading application determines a quantity that has been traded during the at least one time period at a plurality of price levels. The trading application may determine the traded quantity for one or more time periods using the methods described above.

At step 308, the trading application displays the traded quantity for each of the user defined time periods via a graphical interface. According to the preferred embodiment, the traded quantities determined for one or more user configurable time periods at one or more price levels are displayed in relation to a static axis of prices. However, it should be understood that different embodiments are possible as well, and the quantities may be displayed in any manner including a graphical and/or numerical format. Further, it should be understood that providing traded quantities to a user is not limited to using graphical representations, and any type of output such as audio announcements or text could be used as well.

At step 310, the trading application periodically updates the displayed quantities for the user defined time periods based on market updates that are received from the exchange. In one embodiment, for example, a user defined time period may be associated with a number of buckets arranged to store data for a shorter time periods. For example, one minute time period may be associated with ten buckets for storing data associated with 6 seconds within that minute. In such an embodiment, the displayed quantity may be updated every 6 seconds, or a multiple of the 6 second interval, where data is shifted between buckets as explained above. It should be understood that this is only an example, and different embodiments are possible as well. Further, a user may configure how often the data displayed for each user defined time period is updated. Further, it should be understood that traded quantity data associated with the most recent time period may be updated dynamically and every time the trading application receives a new update from an exchange.

Figure 4:
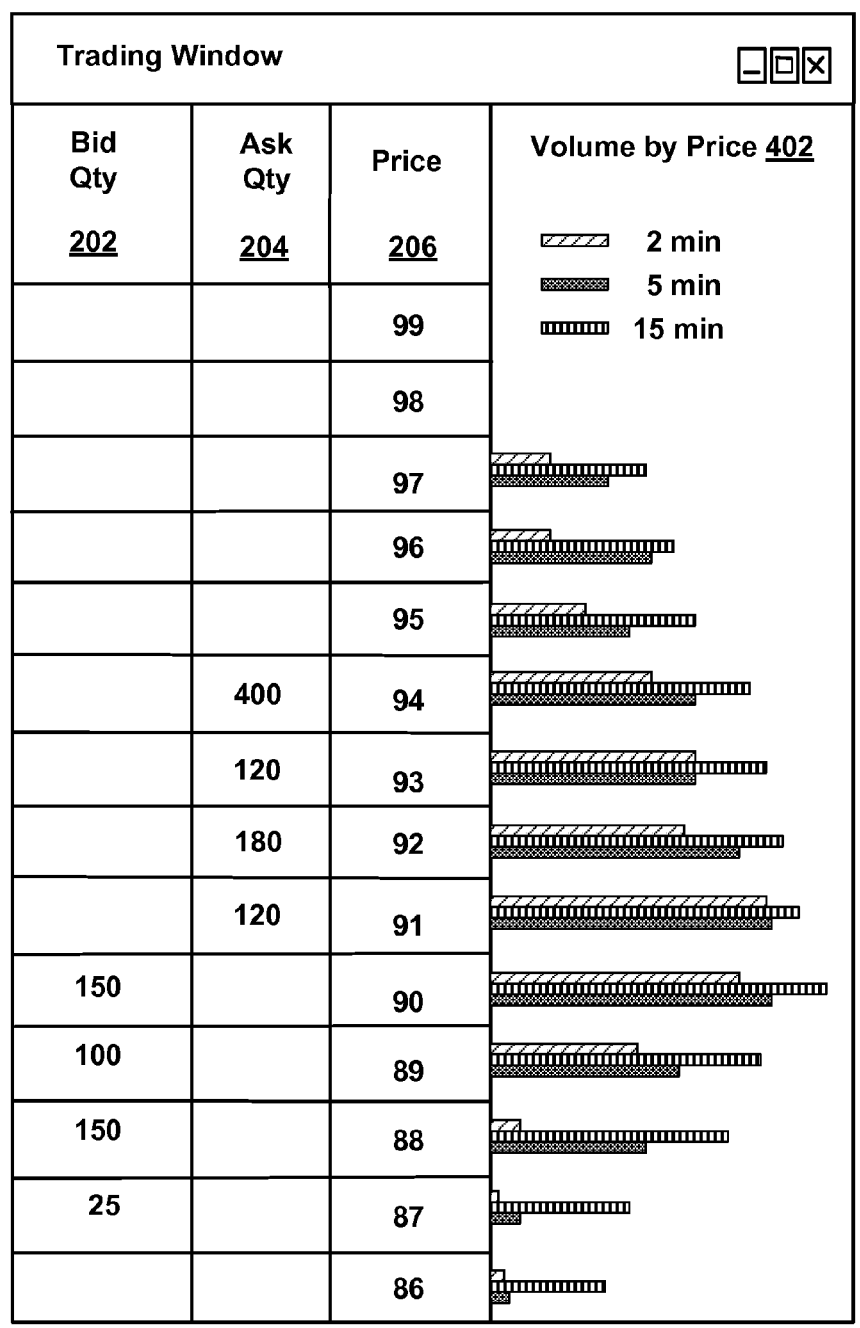
FIG. 4 is a block diagram illustrating a trading interface that may be used for displaying traded quantity information for a plurality of user configurable time periods according to one example embodiment.

FIG. 4 is an example embodiment of a trading interface 400 that may be used to display traded quantity, or volume, at a plurality of price levels for a plurality of user configurable time periods. It should be understood that the trading interface 400 is not limited to displaying the illustrated information, and different or additional market/trader related information may be displayed via the interface 400.

As illustrated in FIG. 4, the trading interface 400 includes four columns. In addition to the three columns including the bid quantity column 202, the ask quantity column 204, and the price column 206 that have been described in reference to FIG. 2, the trading interface 400 includes a volume by price column 402 that may be used to display traded quantities for a plurality of user configurable time periods in relation to the static axis of prices. As illustrated in FIG. 4, the user configurable time periods include a 2 minute time period, a 5 minute time period, and a 15 minute time period.

The quantities associated with each time period are displayed using a grouped bar chart that displays traded quantities for different time intervals by means of adjacent horizontal bars at each price level. To distinguish traded quantities associated with each time interval, the bars corresponding to different time intervals may be displayed using different colors or different graphical patterns. It should be understood that the colors or graphical patterns used for each time period may be user configurable. Further, in addition to displaying traded quantities for each user configurable time period in a graphical format, numerical quantities could also be displayed in relation to each or some bars. Alternatively, a numerical scale may be displayed in relation to the bar chart so that a trader can use the scale to read the quantity value corresponding to each bar. Further, it should be understood that traded quantities corresponding to each time period may be displayed in any order, and the arrangement of the bars may be user configurable. For example, traded quantities associated with the longest time period may be displayed in the upper bar.

Figure 5:
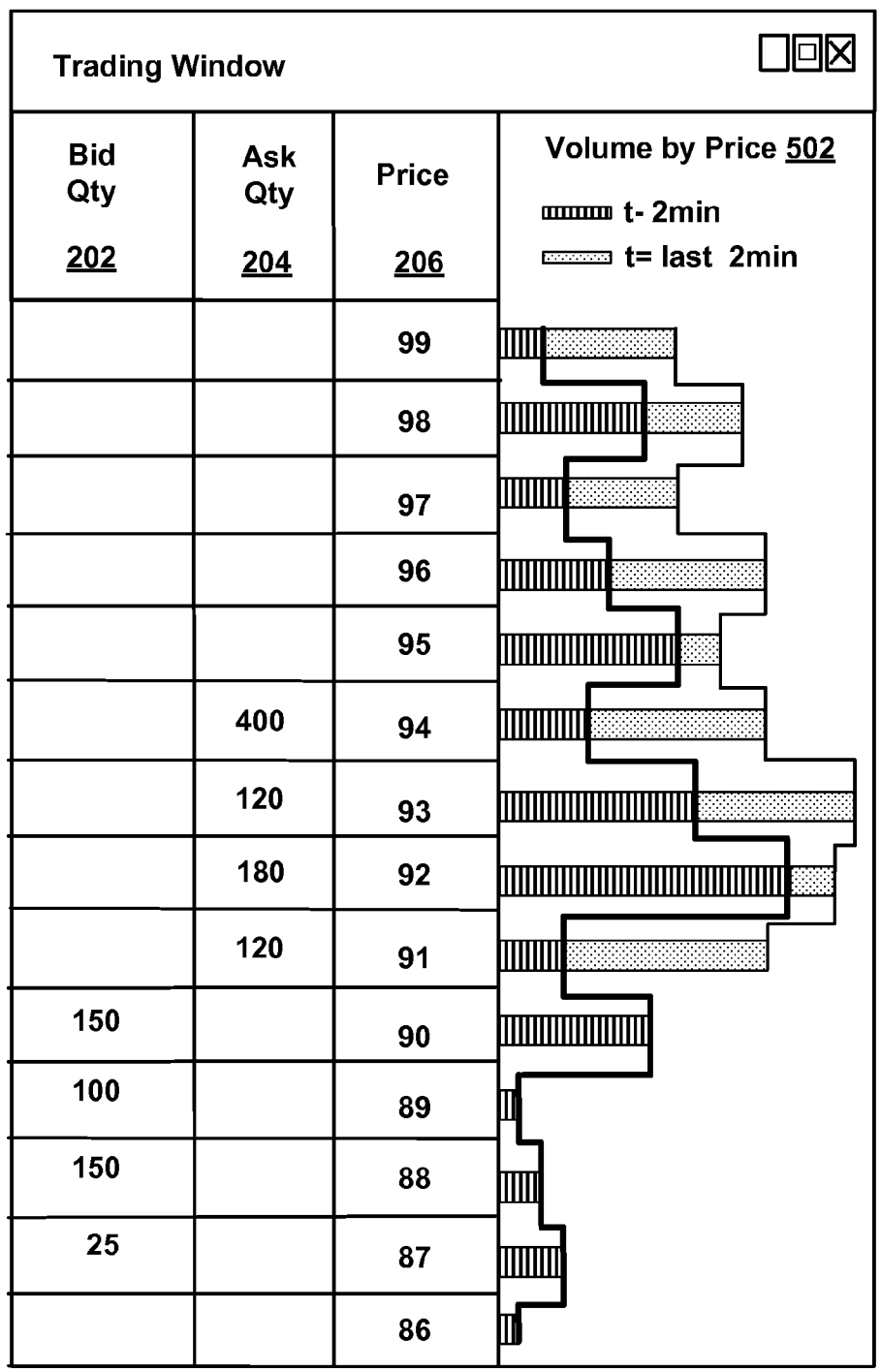
FIG. 5 is a block diagram illustrating a trading interface that may be used for displaying traded quantity information for a plurality of user configurable time periods according to another embodiment.

FIG. 5 is another example embodiment of a trading interface 500 that may be used to display traded quantities that may be determined for a plurality of user configurable time periods. Similarly to the preceding Figure, the trading interface includes the bid quantity column 202, the ask quantity column 204, the price column 206, and the volume by price column 502.

The volume by price column 502 displays traded quantities for two time periods including the last two minutes and two minutes before the most recent two minutes, thus effectively displaying traded quantities during the last four minutes of trading. In the embodiment illustrated in FIG. 5, the traded quantities are displayed using a subdivided bar chart, and the quantities corresponding to different time periods are displayed on the same bar that is divided into sub-bars corresponding to each time period. It should be understood that instead of displaying the most recent time period on the most outer sub-bar, the quantities associated with that time period may be displayed on the first sub-bar, or a bar corresponding to the zero line of a numerical scale, so that the latest quantity can be read directly from the scale. Many different or equivalent embodiments are possible as well. Further, alternatively, instead of displaying bars corresponding to each time period, a linear contour or outline of all bars, as illustrated in FIG. 5.

It should be understood that the traded quantities for a plurality of time periods may be displayed in a row format rather than columns, or the grid may be eliminated entirely and the information presented graphically. As one alternative example, the information may be presented in a row display. For example, the row display may be a static price display in which the row includes a price, a bid quantity, an ask quantity, and the traded quantity information, and the display may include multiple rows corresponding to multiple price levels. Further, alternatively, the trading interface may not display the price column, and different information may be displayed instead. Further, the present invention is not limited to the two-dimensional displays, but rather any number of dimensions may be used to display traded quantities during a number of time periods for a particular price level. Further, it should be understood that the present invention is not limited to interfaces that display traded quantities in a graphical format. Alternatively, or in addition to the graphical representation, numerical representations could also be used. Various other modifications could also be made.

In addition to displaying total traded quantities for a plurality of price levels and one or more user configurable time periods, the trading interface may also distinguish whether the traded quantity is associated with a buying or selling activity. In one embodiment, the traded application may determine if a transaction corresponds to a sell or a buy using the LTP and the inside market information provided in the received update. For example, if the LTP received in an update is equal to the current bid, then the traded application may consider the LTQ as a sell, since an offer matched the price level of the existing bid. Thus, if an offer initiates the transaction, the traded quantity may be considered a sell. Similarly, if the LTP is equal to or higher than the current ask then the traded application may consider the corresponding LTQ as a buy, since a bid matched a pending offer. Thus, if a quantity has been traded at a price level equal to or higher than the best ask, the quantity may be added to the total buy volume. Similarly, if a quantity has been traded at a price level equal to or lower than the best bid, the quantity may be added to the total sell volume. The traded quantities corresponding to buys and sells may be then displayed to a user via a trading application. Further, in case the exchange reports the new bid/ask before the LTP, the trading application may keep track of the previous bid/ask.

However, if the trading application receives updates less frequently, and the updates correspond to a snapshot of the market rather than market updates that are sent every time the market changes, the trading application may not be able to determine whether the traded quantity corresponds to a buy or a sell based on the received data. For example, if a quantity is traded at a price level between the known inside market price levels, the trading application might not be able to classify such quantity as either a buy or a sell. In such an embodiment, the trading application may classify such a quantity as a "Rest" or "Other" quantity. Such quantity may be displayed in addition to the known buys and sells so that a traded may visually approximate the total traded quantity at each price level during one or more time intervals.

Figure 6:
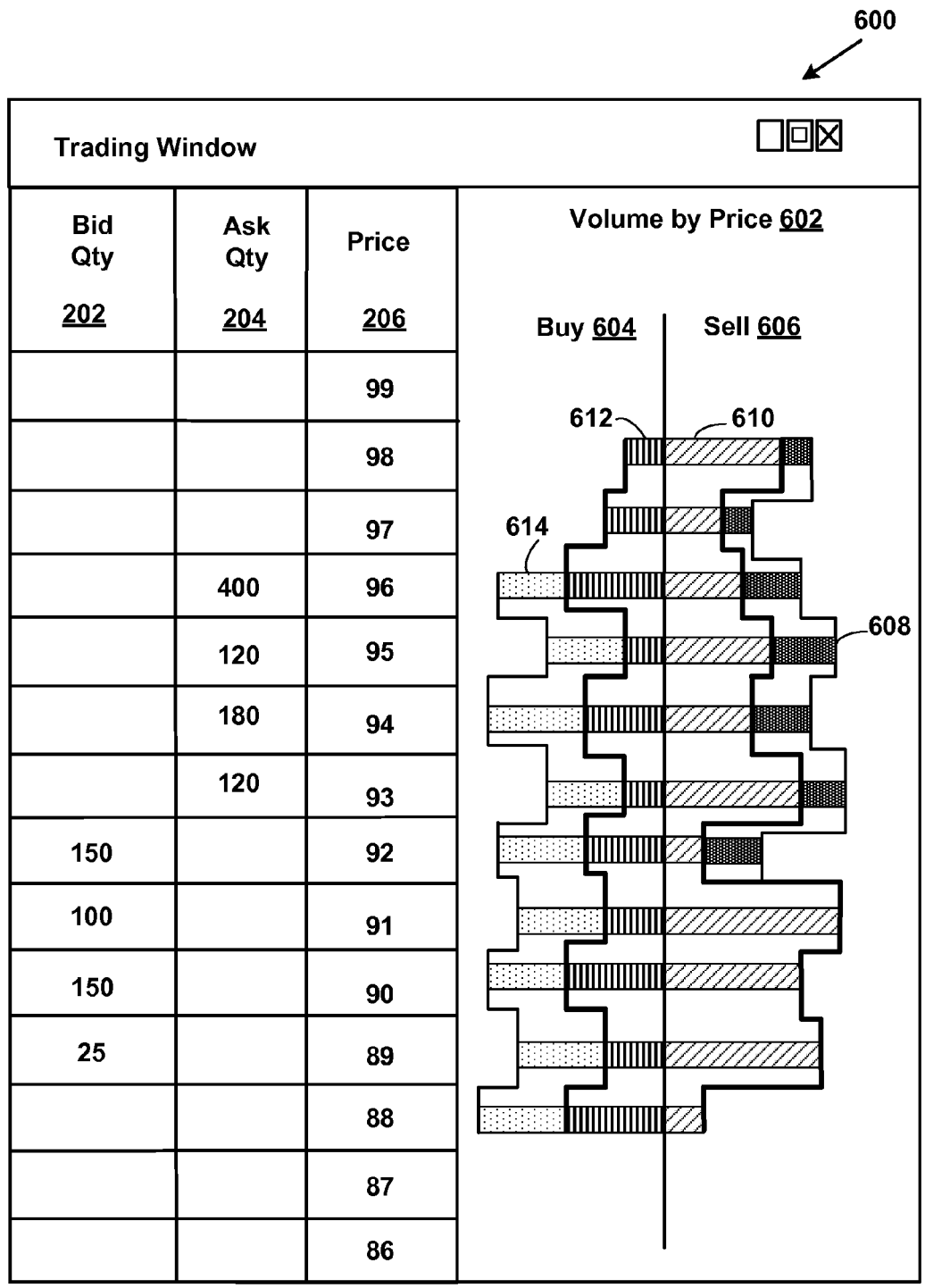
FIG. 6 is a block diagram illustrating a trading interface that may be used for displaying traded quantity information related to buys and sells for a plurality of user configurable time periods.

FIG. 6 is an example embodiment of a trading interface 600 that may be used to display buy and sell traded quantities at a plurality of price levels for a plurality of user configurable time periods.

The trading interface 600 includes the bid quantity region 202, the ask quantity region 204, the price region 206, and a volume by price region 602. The volume by price region 602 displays traded quantities associated with buys 604 and sells 606 using a split bar graph, where buy/sell traded quantities 612 and 610 are associated with a first time period, and buy/sell traded quantities 614 and 608 are associated with a second time period. For example, the buy/sell traded quantities 612 and 610 may correspond to the last 5 minutes of the trading activity, and the buy/sell traded quantities 614 and 608 may correspond to 5 minutes before the last 5 minutes. As explained in earlier paragraphs, it should be understood that a trader may configure time periods for which the trading application may determine and display traded quantities associated with buys or sells. Further, using the buy and sell traded quantity graphs, a trader may determine the total traded quantity by visually adding the buy and sell traded quantity for each time period. For example, the buy traded quantity 612 and the sell traded quantity 610, when added, correspond to the total traded quantity during the time period corresponding to both, such as the last 5 minutes of trading activity, for example. Further, a numerical scale may be displayed on each side of the graph so that a trader can easily read traded quantities corresponding to buys and sells. It should be understood that the buy and sell quantities may be displayed on the same side, and the buys and sells may be color-coded. For example, buys and sells may be displayed on a graphical interface such as the one illustrated in FIG. 5. In such an embodiment, each bar may be subdivided and color-coded to represent buys and sells.

Alternatively, instead of displaying buys and sells, only one group of traded quantities such as buys or sells may be displayed in addition to the total traded quantity. It should be understood that a user may configure what is displayed via the trading interface. For example, a user may decide that he/she wants to view only traded buys, only traded sells, or a combination of the traded buys and the total traded quantity at each price level and during one or more defined time periods.

Figure 7:
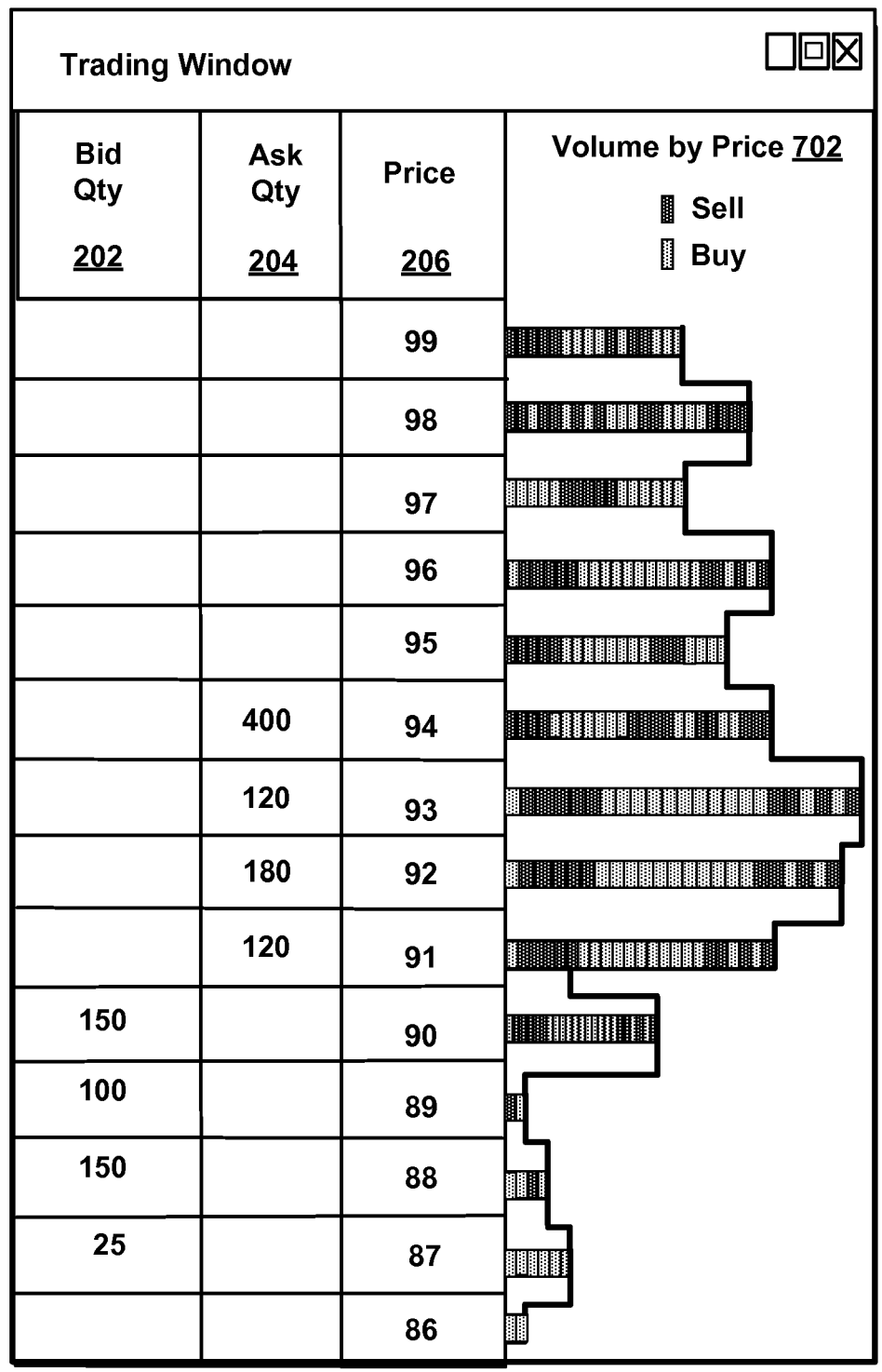
FIG. 7 is an example embodiment of a trading interface that may be used to display traded quantities at a plurality of price levels where each traded quantity during a user configured time period may be identified as a buy or a sell.

FIG. 7 is an example embodiment of a trading interface 700 that may be used to display traded quantities at a plurality of price levels where each traded quantity during a user configured time period may be identified as a buy or a sell. The trading interface 700, in addition to the bid quantity, ask quantity, and price columns 202, 204, and 206, includes a volume by price column 702. In addition to displaying the total traded quantity using a bar chart representation, each bar may display whether each trade during the time period was a buy or a sell. Further, it should be understood that each box associated with a buy or a sell may correspond to a predetermined quantity, such as a quantity of 5, 10, or any other user configurable quantity, or simply each contract. Additionally, buys and sells may be displayed using any graphical, color-coded representation, and those skilled in the art will understand that the same information may be displayed using many different ways.

Figure 8:
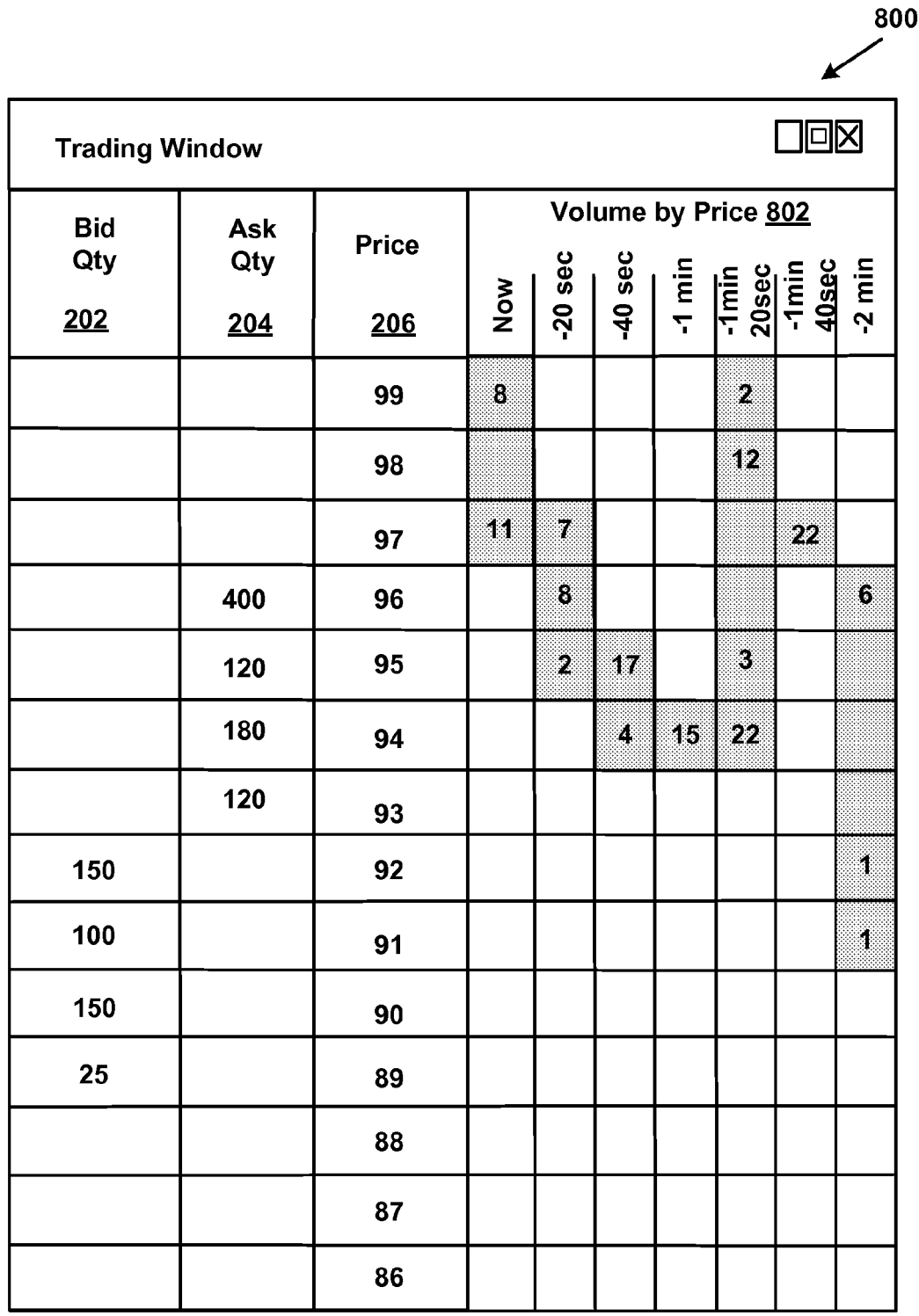
FIG. 8 is a block diagram illustrating a trading interface that may be used for displaying traded quantity information for a plurality of user configurable time periods using a candlestick graphical representation according to one embodiment.

FIG. 8 is an example embodiment of a trading interface 800 that may be used to display traded quantities at a plurality of price levels according to another example embodiment using a graphical representation that is similar to a candlestick graph.

The trading interface 800 includes the bid quantity, ask quantity, and price columns 202, 204, and 206, and a volume by price column 802. However, instead of displaying traded quantities using a horizontal bar graph, the volume by price column 802 displays graph in a candlestick format of total traded quantities, and each candlestick box corresponds to a preset or user-configurable time period. Further, using the example embodiment, a trader may see at what prices no quantity has been traded. However, unlike a typical candlestick box, which would only provide highest and lowest prices during the corresponding time period, each candlestick according to an example embodiment, displays quantities that have been traded at any price level during the corresponding time period. According to an embodiment illustrated in FIG. 8, a candlestick box corresponds to 20 seconds, and extends vertically up and down between the highest and lowest prices at which the quantities have been traded. Further, each candlestick box shows the total traded volume for each price level that was part of a time period. Using such a display, a trader can see the total traded volume at certain price levels during each time period, as well as price levels at which no quantity has been traded during certain time periods. According to an example embodiment, as time continues to move, candlestick boxes may continue to shift to the right, with each candlestick column's data moving to the column to its right as each time period expires. It should be understood that a trader may configure a time period as well as a number of candlestick boxes to be simultaneously displayed via the trading interface.

The candlestick implementation for displaying traded quantities is not limited to the embodiment illustrated in FIG. 8, and many modifications are possible as well. For example, instead of displaying the traded quantities to the right of the price column 802, the candlestick traded quantity chart may be displayed on the left side instead, with the ask and bid columns on the left side of the price column 802.

Figure 9:
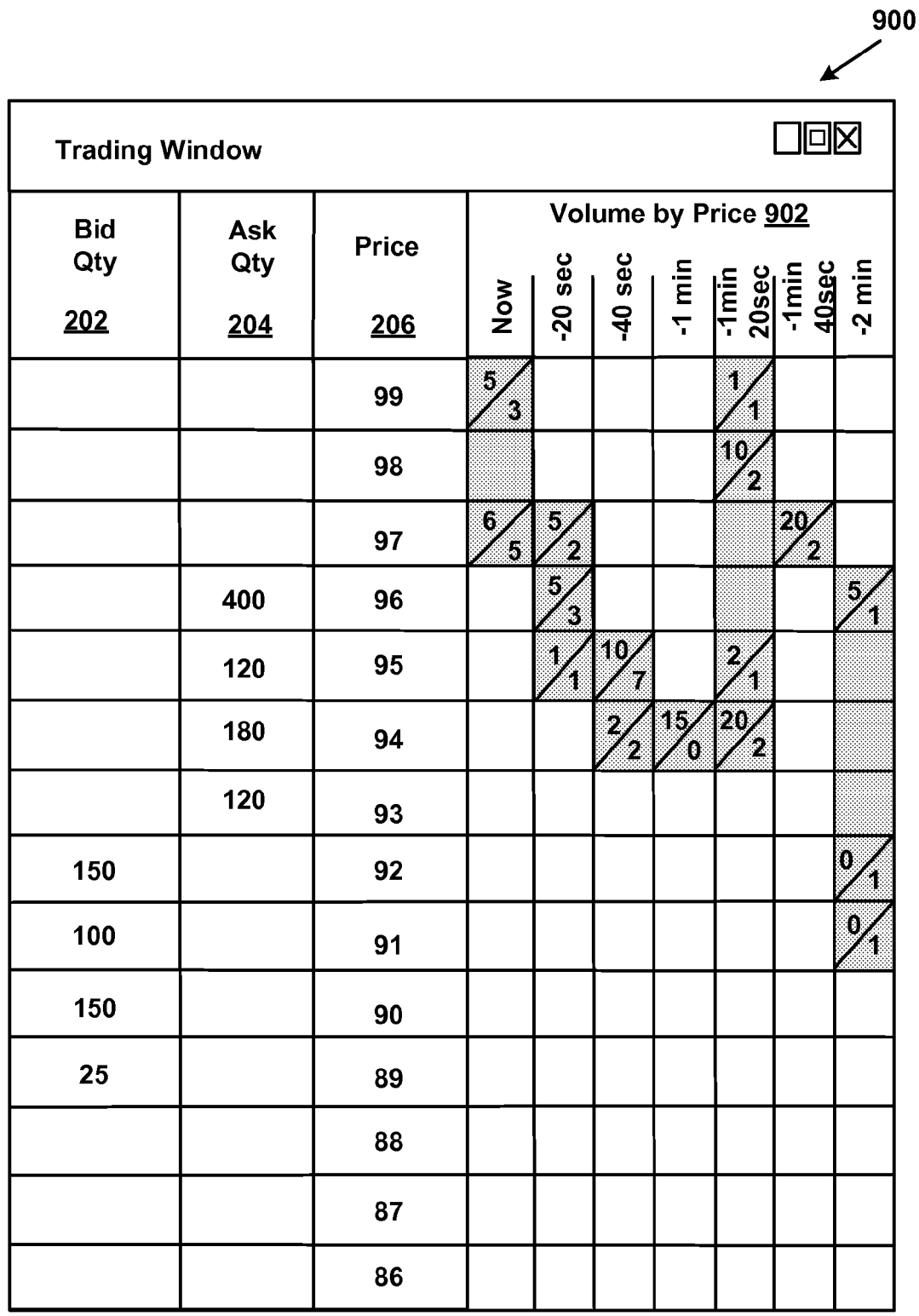
FIG. 9 is a block diagram illustrating a trading interface that may be used for displaying traded quantity information related to buy and sells for a plurality of user configurable time periods using a candlestick graphical representation according to another embodiment.

FIG. 9 is another example embodiment of a trading interface that may be used to display buy and sell traded quantities at a plurality of price levels according to another example embodiment using candlestick graphical representation.

The trading application 900 includes the bid, ask, and price columns 202, 204, and 206, and a volume by price column 902. Instead of displaying the total traded quantities, the volume by price column 902 displays total traded buys and sells for each price level during user-configurable time periods. For example, the quantities displayed in the upper left portion of each box may correspond to the buy quantities, and the quantities displayed in the lower right portion of each box may correspond to the sell quantities. However, it should be understood that many different embodiments are possible and are not limited to the display in FIG. 9. For example, the buy quantities may be displayed using one color and the sell quantities may be displayed using another color.

Further, it should be understood that the trading interface can display any time-based values or derived time based values during any combination of user controlled multiple time periods. Further, the time-based values are not limited to a single source, and may be received from multiple sources, such as multiple exchanges. Additionally, prices may be calculated using other data, such as spread prices for tradable objects being traded at the same or different exchanges, and quantities may be derived using any user-configurable algorithms, such as implied spread quantities within and across markets. Further, prices and quantities for user configurable time periods may be calculated using any user configurable algorithms or formulas, or market prediction applications using any other inputs. Further, in addition to the traded quantities, and buys/sells, the trading interface may display bid/ask quantities during one or more user configurable time periods, un-traded bid quantities, un-traded ask quantities. Alternatively, instead of monitoring total quantities, the trading application may determine and display for a particular time period a maximum traded quantity that may be determined based on absolute traded values being received from the exchange. Further, alternatively, an average bid or ask quantity could be displayed as well.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications. For example, it should be understood that the randomization methods described above may be used separately, or in any combination specified by the user.

Further, it will be apparent to those of ordinary skill in the art that methods involved in the system and methods for displaying quantity information during a user configurable and shifting time period may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed:

1. A method for processing and displaying data for use in electronic trading, the method comprising:
    displaying an indicator associated with a total traded quantity in relation to a price level of a plurality of price levels at which a tradeable object is traded at an electronic exchange, wherein the total traded quantity is determined at the price level for a first time period defined between a predefined start time and a current time, wherein the total traded quantity is determined using market updates being received from the electronic exchange;
    dynamically determining by a computing device a traded quantity for a second time period at the price level using market updates being received from the electronic exchange, wherein the second time period is associated with a moving time window corresponding to a predetermined number of time units of the first time period;
    subdividing the indicator to graphically represent a portion of the total traded quantity that corresponds to the traded quantity during the second time period;
    dynamically updating the indicator to reflect the total traded quantity during the first time period; and
    dynamically updating the indicator to reflect the traded quantity during the second time period.

2. The method of claim 1, further comprising:
    dynamically displaying via the computing device the plurality of price levels positioned along a price axis, wherein the indicator is displayed in alignment with the price level along the price axis.

3. The method of claim 1, further comprising:
    receiving an input via a user input device that is used to determine at least one of the first time period and the second time period.

4. The method of claim 1, further comprising:
    receiving an input via a user input device that resets a start for at least one of the first and second time periods.

5. The method of claim 1, further comprising:
    dynamically determining via the computing device a quantity of sell trades that were executed over the first and second time periods at the price level;
    dynamically determining via the computing device a quantity of buy trades that were executed over the first and second time periods at the price level; and
    dynamically displaying via the computing device using the indicator the quantity of sell trades, the quantity of buy trades, or the quantity of buy and sell trades for at least one of the first and second time periods.

6. The method of claim 5, wherein a sell trade represents a last trade occurring on a best bid price and a buy trade represents a last trade occurring on a best ask price.

7. The method of claim 5, wherein the quantity of sell trades and the quantity of buy trades are displayed separately.

8. The method of claim 5, wherein the quantity of sell trades and the quantity of buy trades are displayed together with the quantity of sell trades being displayed using a first graphical format and the quantity of buy trades being displayed using a second graphical format.

9. The method of claim 1, further comprising:
    dynamically displaying a line that divides the indicator to distinguish the total traded quantity during the first time period in relation to the traded quantity during the second time period.

10. The method of claim 1, wherein the computing device comprises one or more computing devices, and wherein each of the one or more computing devices is positioned at one or more locations on a computer network.

11. The method of claim 1, further comprising:
color-coding a portion of the indicator to graphically represent the portion of the total traded quantity that corresponds to the traded quantity during the second time period.

12. The method of claim 1, further comprising:
using a graphical pattern in relation to the indicator to graphically represent the portion of the total traded quantity that corresponds to the traded quantity during the second time period.

13. The method of claim 1, wherein the predefined start time is a starting time of a trading session.

14. The method of claim 1, wherein the second time period comprises the current time of the first time period.

15. A computer readable medium having instructions for causing a computer to execute a method comprising:
displaying an indicator associated with a total traded quantity in relation to a price level of a plurality of price levels at which a tradeable object is traded at an electronic exchange, wherein the total traded quantity is determined at the price level for a first time period defined between a predefined start time and a current time, wherein the total traded quantity is determined using market updates being received from the electronic exchange;
dynamically determining by a computing device a traded quantity for a second time period at the price level using market updates being received from the electronic exchange, wherein the second time period is associated with a moving time window corresponding to a predetermined number of time units of the first time period;
subdividing the indicator to graphically represent a portion of the total traded quantity that corresponds to the traded quantity during the second time period;
dynamically updating the indicator to reflect the total traded quantity during the first time period; and
dynamically updating the indicator to reflect the traded quantity during the second time period.

16. The computer readable medium of claim 15, further comprising:
dynamically displaying via the computing device the plurality of price levels positioned along a price axis, wherein the indicator is displayed in alignment with the price level along the price axis.

17. The computer readable medium of claim 15, further comprising:
receiving an input via a user input device that is used to determine at least one of the first time period and the second time period.

18. The computer readable medium of claim 15, further comprising:
receiving an input via a user input device that resets a start for at least one of the first and second time periods.

19. The computer readable medium of claim 15, further comprising:
dynamically determining via the computing device a quantity of sell trades that were executed over the first and second time periods at the price level;
dynamically determining via the computing device a quantity of buy trades that were executed over the first and second time periods at the price level; and
dynamically displaying via the computing device using the indicator the quantity of sell trades, the quantity of buy trades, or the quantity of buy and sell trades for at least one of the first and second time periods.

20. The computer readable medium of claim 19, wherein a sell trade represents a last trade occurring on a best bid price and a buy trade represents a last trade occurring on a best ask price.

21. The computer readable medium of claim 19, wherein the quantity of sell trades and the quantity of buy trades are displayed separately.

22. The computer readable medium of claim 19, wherein the quantity of sell trades and the quantity of buy trades are displayed together with the quantity of sell trades being displayed using a first graphical format and the quantity of buy trades being displayed using a second graphical format.

23. The computer readable medium of claim 15, further comprising:
dynamically displaying a line that divides the indicator to distinguish the total traded quantity during the first time period in relation to the traded quantity during the second time period.

24. The computer readable medium of claim 15, further comprising:
color-coding a portion of the indicator to graphically represent the portion of the total traded quantity that corresponds to the traded quantity during the second time period.

25. The computer readable medium of claim 15, further comprising:
using a graphical pattern in relation to the indicator to graphically represent the portion of the total traded quantity that corresponds to the traded quantity during the second time period.

26. The computer readable medium of claim 15, wherein the predefined start time is a starting time of a trading session.

27. The computer readable medium of claim 15, wherein the second time period comprises the current time of the first time period.

* * * * *